(12) United States Patent
Okazaki et al.

(10) Patent No.: US 6,411,047 B1
(45) Date of Patent: Jun. 25, 2002

(54) DISPLAY DEVICE COMPENSATING FOR COLOR IRREGURALITY BETWEEN PIXELS

(75) Inventors: Norihiko Okazaki; Norihisa Hayashi, both of Yokohama (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/748,858

(22) Filed: Dec. 28, 2000

(30) Foreign Application Priority Data

Dec. 28, 1999 (JP) .......................................... 11-374156

(51) Int. Cl.[7] .............................................. H05B 37/00
(52) U.S. Cl. ................. 315/312; 315/169.1; 315/169.3; 345/55
(58) Field of Search ........................... 315/169.1, 169.3, 315/312, 313; 313/582, 585; 345/55, 76, 77, 84

(56) References Cited

U.S. PATENT DOCUMENTS

| | | | | |
|---|---|---|---|---|
| 4,822,142 A | * | 4/1989 | Yasui | .......................... 350/332 |
| 5,844,531 A | * | 12/1998 | Betsui | ...................... 315/169.3 |
| 5,973,456 A | * | 10/1999 | Osada et al. | .............. 315/169.1 |

FOREIGN PATENT DOCUMENTS

| | | | |
|---|---|---|---|
| JP | 10-26959 | 1/1998 | ............ G09G/3/32 |
| JP | 2000-155548 | 6/2000 | ............ G09G/3/20 |

* cited by examiner

*Primary Examiner*—Don Wong
*Assistant Examiner*—Jimmy T. Vu
(74) *Attorney, Agent, or Firm*—Parkhurst & Wendel, LLP

(57) ABSTRACT

A large display device whose screen is defined by a matrix of pixels. Each pixel is made up of at least two light-emitting diodes (LEDs): a first LED producing light of first color, and a second LED producing light of second color. The display device includes an LED control circuit designed to actuate the second LED in each pixel by look-up using a correction table to visually mix the light of the second color with the light of the first color produced by a corresponding one of the first LED in a given proportion to minimize a difference in chromaticity of the lights of the first color between the pixels.

12 Claims, 8 Drawing Sheets

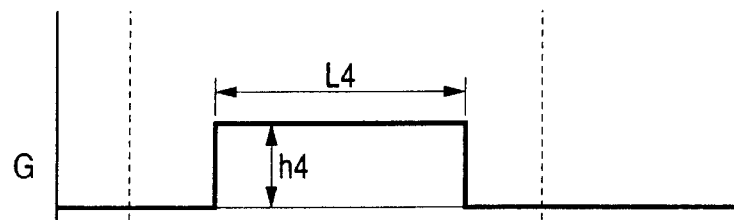
FIG. 4(a) G
FIG. 4(b) R
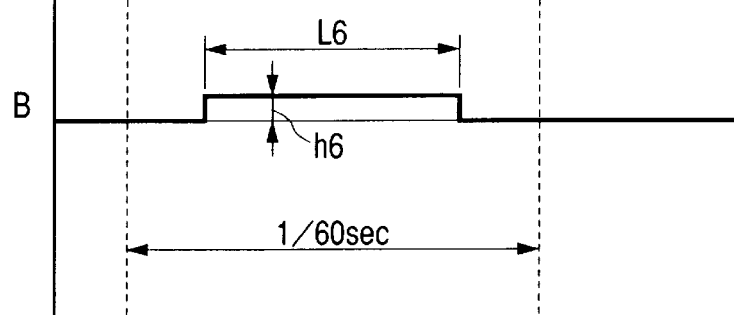
FIG. 4(c) B

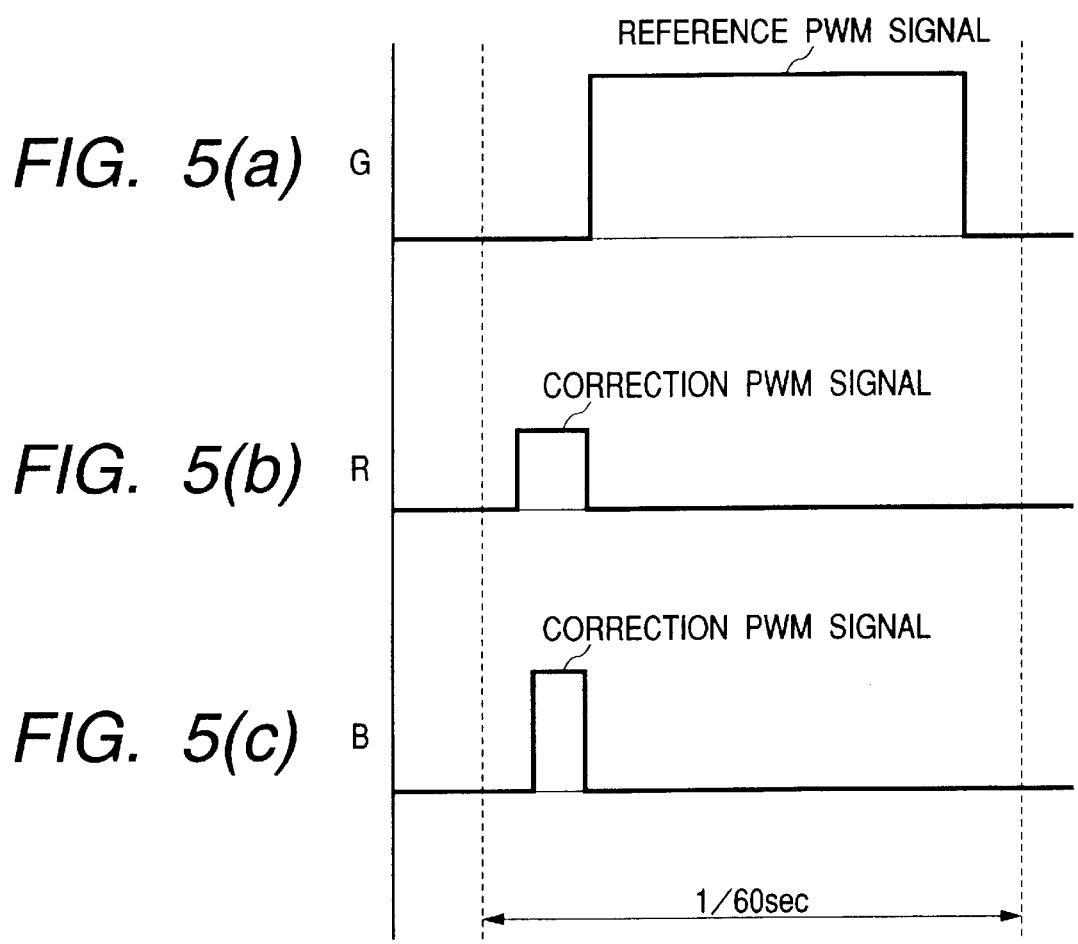

FIG. 6(a) G 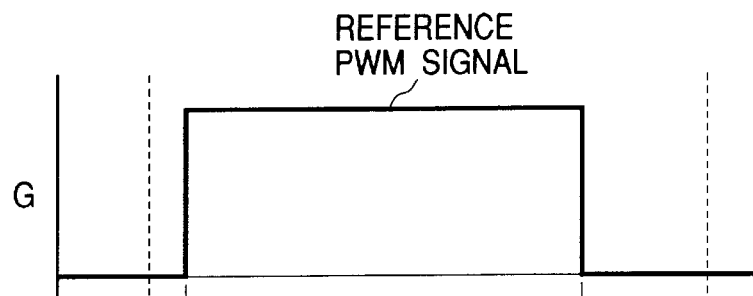
FIG. 6(b) R 
FIG. 6(c) B 

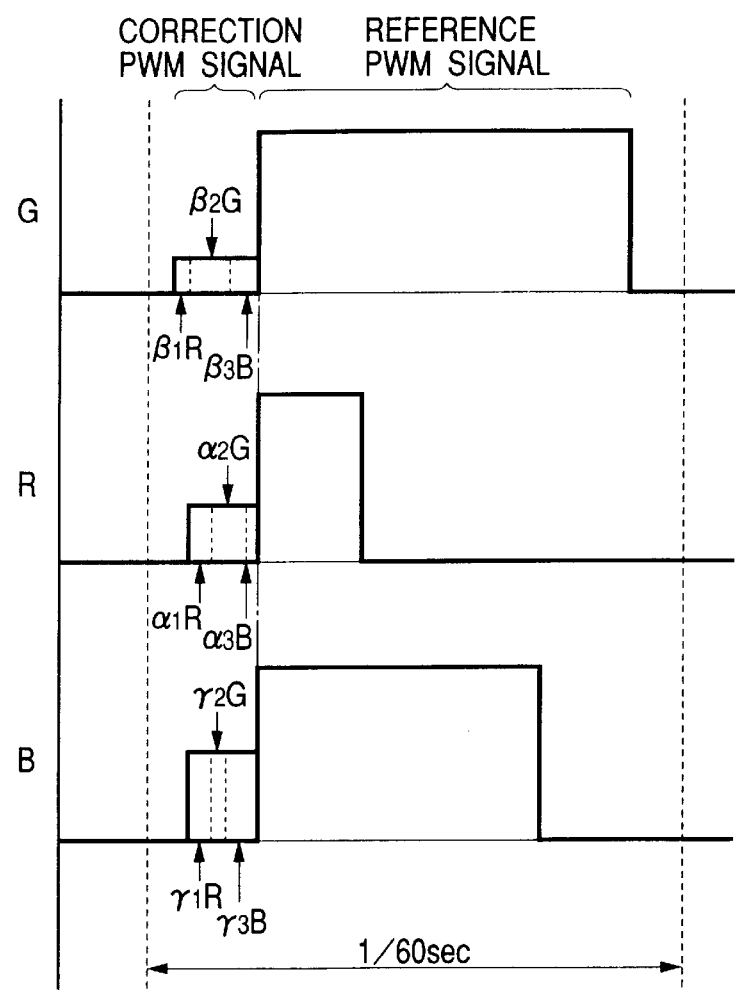

DISPLAY DEVICE COMPENSATING FOR COLOR IRREGURALITY BETWEEN PIXELS

BACKGROUND OF THE INVENTION

1. Technical Field of the Invention

The present invention relates generally to a display device including a matrix of light-emitting elements which are selectively turned on and off to display a still and a moving picture, and more particularly to a display device designed to compensate for differences in luminance and chromaticity of light between pixels for producing high-quality images without irregularity in color over the whole of a screen.

2. Background Art

There are known display units which change the brightness or luminance and chromaticity of light produced by a discharge tube, a CRT, or an array of point sources such as light-emitting diodes (LEDs) each defining a pixel on a screen in response to an image signal to form a still image or a moving image.

LEDs used as light sources defining pixels of a screen are superior in reliability and lifetime to the discharge tubes and CRTs and are employed, especially as pixels on a large-sized screen in recent years. For example, a display unit is known which defines a screen with a rectangular array of pixels each made up of primary color LEDs: red, green, and blue LEDs and modifies the luminance of light emitted by each of the LEDs in response to an image signal to produce a full-color still picture or moving picture.

The color of each pixel of the picture is produced by controlling the brightness of the primary color LEDs in given proportions. However, even when the same brightness level signals are provided to the LEDs, a difference in chromaticity may arise on the screen, which will lead to irregularity in color of the image, resulting in a decrease in image quality.

FIG. 8 shows the CIE 1931 standard colorimetric system (XYZ). As can be seen from the drawing, even when LEDs of the same color are actuated, irregularity in color of light emitted from the LEDs is visually perceived because of a difference in chromaticity between the LEDs. Specifically, an increase in the chromaticity difference between the LEDs will also cause a difference in chromaticity between pixels each consisting of the LEDs of primary colors to be produced.

SUMMARY OF THE INVENTION

It is therefore a principal object of the invention to avoid the disadvantages of the prior art.

It is another object of the invention to provide a display device which is designed to compensate for at least one of differences in luminance and chromaticity of light between pixels for producing high-quality images without irregularity in color over the whole of a screen.

According to one aspect of the invention, there is provided a display device. The display device includes: (a) a screen defined by a matrix of pixels on which an image represented by an image input signal is to be displayed; (b) first light-emitting elements one for each of the pixels, each of said first light-emitting elements being actuated to produce light of a first color in a corresponding one of the pixels; (c) second light-emitting elements one for each of the pixels, each of said second light-emitting elements being actuated to produce light of a second color different from the first color in a corresponding one of the pixels; and (d) a light-emitting element controlling circuit responsive to the image input signal to control actuation of each of said first and second light-emitting elements to form the image on said screen, said light-emitting element controlling circuit actuating said second light-emitting element in each of the pixels to visually mix the light of the second color with the light of the first color produced by a corresponding one of said first light-emitting elements in a given proportion to minimize a difference in chromaticity of the lights of the first color between the pixels.

In the preferred mode of the invention, the light-emitting element controlling circuit also actuates said first light-emitting element in each of the pixels to visually mix the light of the first color with the light of the second color produced by a corresponding one of said second light-emitting elements in a given proportion to minimize the difference in chromaticity of the lights of the second color between the pixels.

Third light-emitting elements may be provided one for each of the pixels. Each of said third light-emitting elements is actuated to produce light of a third color different from the first and second colors. The light-emitting element controlling circuit actuates said second light-emitting element and said third light-emitting element in each of the pixels in a given luminance proportion to minimize a shift in chromaticity of the light of the first color produced by a corresponding one of the first light-emitting elements from a reference one.

The light-emitting element controlling circuit is responsive to the image input signal to produce reference pulse signals each for actuation of one of the first light-emitting elements for producing the light of the first color at a given luminance specified by the image input signal. Each of the reference pulse signals has a width specifying a duration of emission of the light from a corresponding one of the first light-emitting elements and a height that is a function of a value of current for excitation of the one of the first light-emitting elements. The light-emitting element controlling circuit stores therein correction factors each required to substantially compensate for a shift in chromaticity of the light emitted from one of first light-emitting elements from a reference one and produces correction pulse signals based on the correction factors each of which is applied to a corresponding one of said second light-emitting elements to produce the light of the second color, thereby minimizing the difference in chromaticity of the lights of the first color between the pixels.

The light-emitting element controlling circuit may produce the correction pulse signals each of which has a width substantially identical with the width of a corresponding one of the reference pulse signals and a height determined based on a corresponding one of the correction factors as a function of the shift in chromaticity of the light from the reference one.

The light-emitting element controlling circuit may alternatively produce the correction pulse signals each of which has a height substantially identical with the height of a corresponding one of the reference pulse signals and a width determined based on a corresponding one of the correction factors as a function of the shift in chromaticity of the light from the reference one.

The light-emitting element controlling circuit may output each of the correction pulse signals in a given time sequential relation to output of a corresponding one of the reference pulse signals.

The light-emitting element controlling circuit may also correct each of the reference pulse signals so as to substantially eliminate a difference between a luminance of the light emitted from a corresponding one of the first light-emitting elements and a target one.

The light-emitting element controlling circuit may produce the correction pulse signals based on the correction factors which are applied to said second and third light-emitting elements in a corresponding one of the pixels to produce the lights of the second and third colors, thereby visually shifting the light of the first color to the second and third colors to minimize the difference in chromaticity of the lights of the first color between the pixels.

The light-emitting element controlling circuit may correct each of the reference pulse signals so as to substantially eliminate a difference between a luminance of the light emitted from a corresponding one of the first light-emitting elements and a target one.

Each of the first color, the second color, and the third color is one of red, green, and blue.

Each of said first, second, and third light-emitting elements may be implemented by a light-emitting diode.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 4(a) shows an example of a reference PWM signal for actuating a green LED;

FIGS. 4(b) and 4(c) show examples of correction PWM signals to actuate a red and a blue LED for compensating for a shift in chromaticity of light emitted from the green LED in FIG. 4(a) from a target one;

FIG. 5(a) shows a second example of a reference PWM signal for actuating a green LED;

FIGS. 5(b) and 5(c) show examples of correction PWM signals to actuate a red and a blue LED for compensating for a shift in chromaticity of light emitted from the green LED in FIG. 5(a) from a target one;

FIG. 6(a) shows a third example of a reference PWM signal for actuating a green LED;

FIGS. 6(b) and 6(c) show examples of correction PWM signals to actuate a red and a blue LED for compensating for a shift in chromaticity of light emitted from the green LED in FIG. 6(a) from a target one;

FIG. 7(a) shows a fourth example of a reference PWM signal for actuating a green LED;

FIGS. 7(b) and 7(c) show examples of correction PWM signals to actuate a red and a blue LED for compensating for a shift in chromaticity of light emitted from the green LED in FIG. 7(a) from a target one.

DESCRIPTION OF THE PREFERRED EMBODIMENTS

Figure 1:
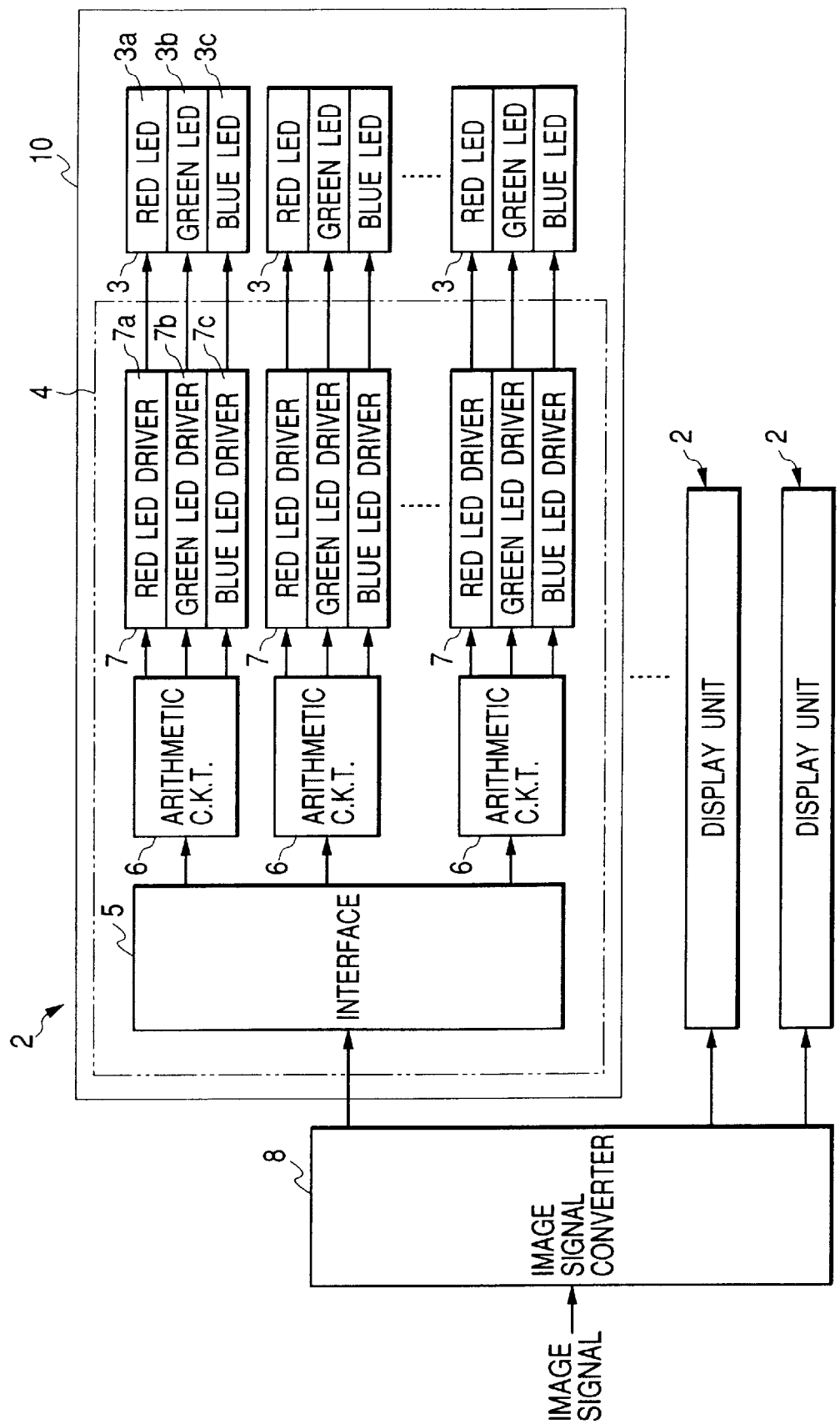
FIG. 1 is a block diagram which shows a display device according to the present invention.
Figure 2:
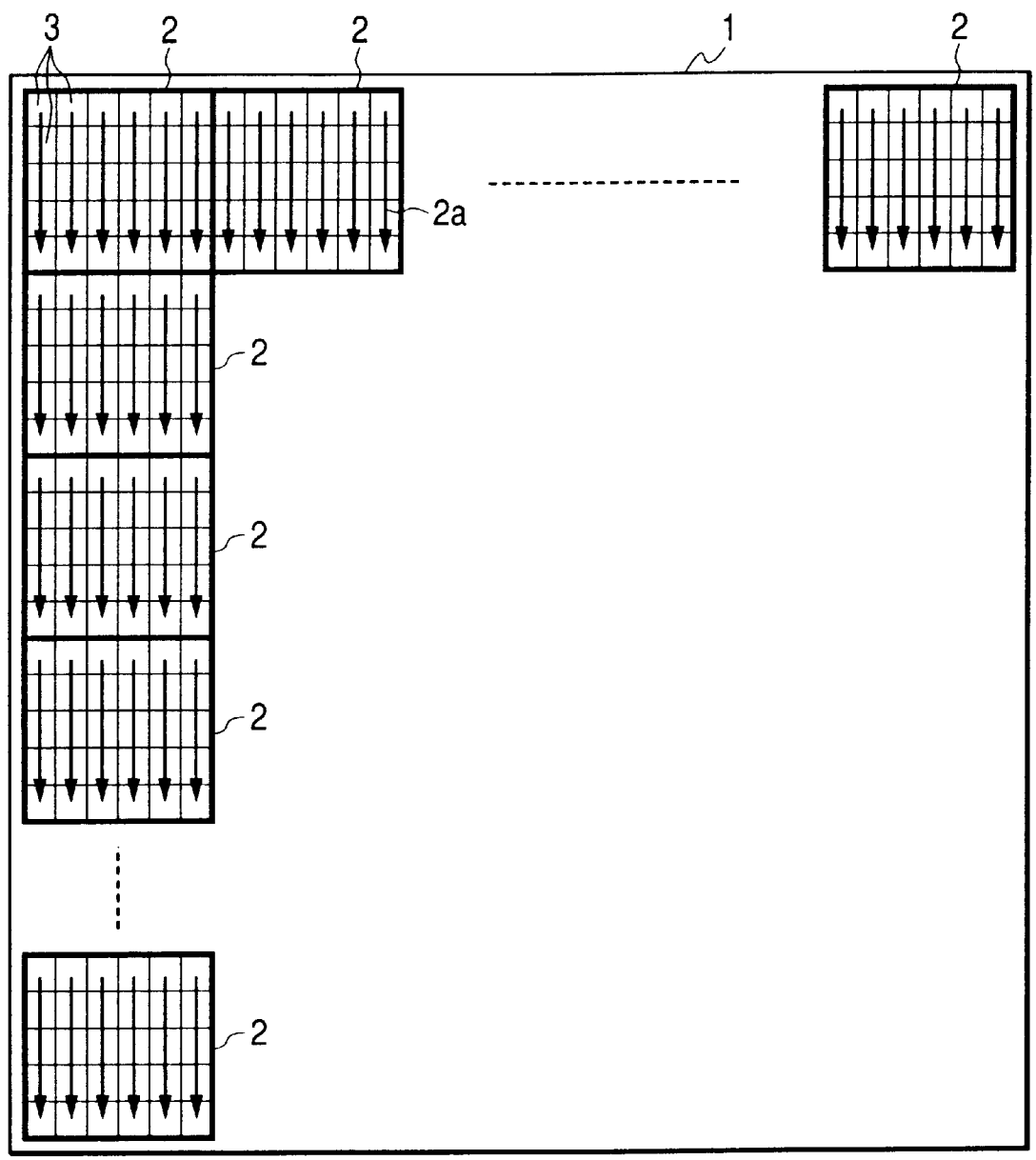
FIG. 2 is a plan view which a screen of the display device in FIG. 1.

Referring to the drawings, wherein like reference numbers refer to like parts in several views, particularly to FIGS. 1 and 2, there is shown a large display device 1 according to the present invention.

The large display device 1 consists of a matrix of display units 2 and an image signal converter 8. The number of the display units 2 is determined as a function of the size of a screen of the large display device 1. Specifically, the display units 2 form one screen as a whole, as shown in FIG. 2. Each of the display units 2 has a matrix of, for example, 256 pixels 3. The pixels 3 are actuated in units of primary colors to form on one of the display units 2 a portion of a large-sized full color image to be displayed on the large display device 1.

The display unit 2 consists of a rectangular frame 10, primary color light-emitting diodes: red LEDs 3a, green LEDs 3b, and blue LEDs 3c arranged on a front surface of the rectangular frame 10 to define the pixels 3, and a printed circuit board 4 installed on a reverse surface of the rectangular frame. The printed circuit board 4 has disposed thereon an interface 5, arithmetic circuits 6, and driver units 7. The interface 5 receives image signals outputted from the image signal converter 8. The arithmetic circuits 6 are provided one for each pixel 3. Each of the driver units 7 consists of a red LED driver 7a, a green LED driver 7b, and a blue LED driver 7c which are responsive to pulse signals from one of the arithmetic circuits 6 to actuate the red LED 3a, the green LED 3b, and the blue LED 3c, respectively. The image signal converter 8 receives an image signal representing an image to be display on the screen of the large display device 1 from an external device and divides it into image signals for the display units 2, respectively.

The number of the pixels 3 is, as described above, 256. The driver units 7 are provided one for each of the pixels 3 and each one of them consists of the three LED drivers 7a, 7b, and 7c. The total number of the LED drivers 7a to 7c is 768. All the LED drivers 7a to 7c may be built in a single integrated circuit mounted on the printed circuit board 4. Each of the pixels 3 may alternatively be defined by more than or less than three LEDs. For example, four or more LEDs may be used to combine three colors in various proportions to specify any other color.

The image signals are, as described above, distributed to each of the display units 2 and inputted to the arithmetic circuits 6 through the interface 5. Each of the arithmetic circuits 6 converts the inputted signals into image signals R', G', and B', as described below in detail, and outputs them to the driver units 7 in the form of pulse signals (also referred to below as PWM signals) whose width defines the duration of emission of light from the LEDs 3a to 3c and height or amplitude is a function of a current value for excitation of a corresponding one of the red, green, and blue LEDs 3a, 3b, and 3c. Specifically, the red, green, and blue LED drivers 7a, 7b, and 7c of each of the driver units 7 are responsive to the PWM signals to control the actuation of the red, green, and blue LEDs 3a, 3b, and 3c so that red, green, and blue lights may be combined in given proportions to produce a given colored light in each of the pixels 3. Each of the display units 2, as indicated by arrows 2a in FIG. 2, turns on vertical arrays of the pixels 3 at intervals of 60 sec. to form an image visually.

The display device 1 is designed to decrease a difference in chromaticity between the pixels 3 to minimize the irregularity in the same color of an image displayed on the screen.

This is achieved by adjusting the luminance of light emitted from each of the red, green, and blue LEDs 3a, 3b, and 3c in a manner as described below.

Figure 3A:
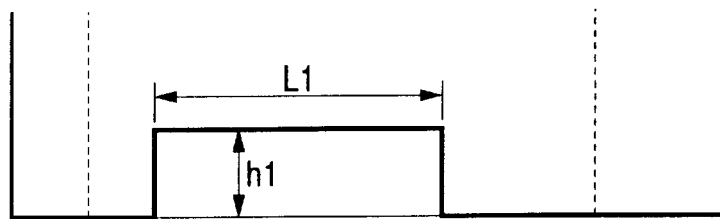
FIG. 3(a) shows a reference PWM signal to actuate each LED.
Figure 3B:
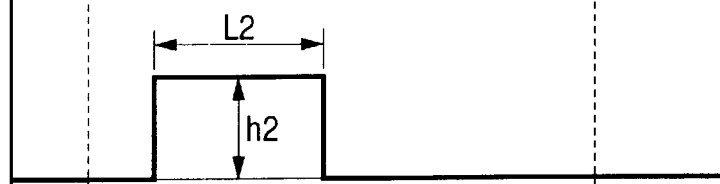
FIGS. 3(b) and 3(c) show examples of modified reference PWM signals for adjusting the luminance of light emitted from each LED.
Figure 3C:
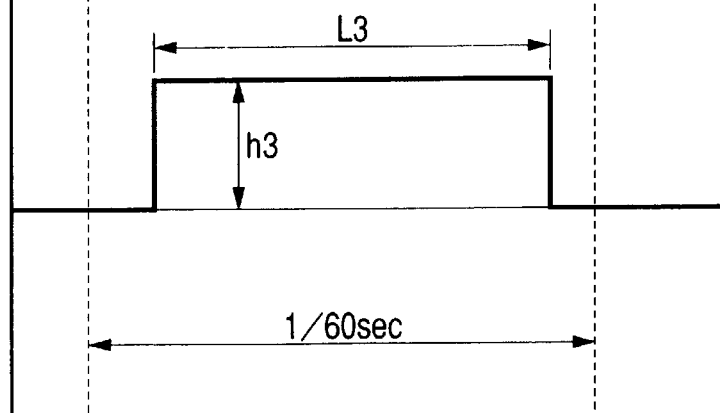

FIGS. 3(a), 3(b), and 3(c) show an example of the PWM signal inputted to each of the red, green, and blue LED drivers 7a, 7b, and 7c for specifying the luminance of output light. The following discussion will be referred to the green LED 3b as an example.

First, a reference PWM signal, as shown in FIG. 3(a), is provided to excite the green LED 3b. The pulse width L1, as described above, defines the duration of emission of light from the green LED 3b. The pulse height h1 represents the current value for excitation of the green LED 3b. Next, the brightness or luminance of light emitted from the green LED 3b is measured. When the luminance of light emitted from the green LED 3b is higher than a target one, either or both of the emission duration L1 and the current value h1 are decreased to determine, as shown in FIG. 3(b), an emission duration L2 and a current value h2 required to bring the luminance of light into agreement with or close to the target one. Alternatively, when the luminance of light emitted from the green LED 3b is lower than the target one, either or both of the emission duration L1 and the current value h1 are increased to determine, as shown in FIG. 3(c), an emission duration L3 and a current value h3 required to bring the luminance of light into agreement with or close to the target one.

Figure 8:
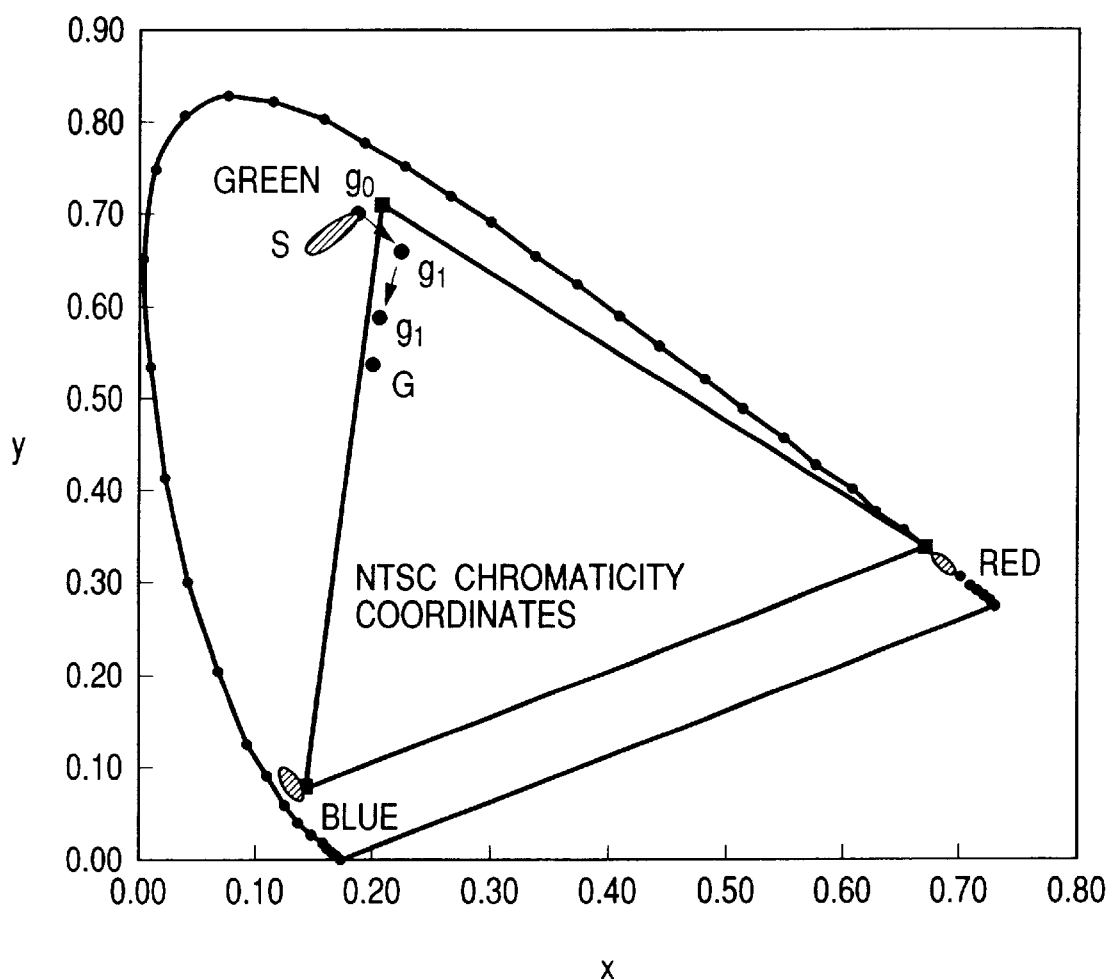
FIG. 8 shows the CIE 1931 standard colorimetric system (XYZ).

However, if the green light lies within a range S of the standard colorimetric system in FIG. 8, it is impossible to shift the green light to red and blue sides, that is, to decrease the range S only by the luminance adjustment as described above. A shift in chromaticity of the green light from a reference one is, therefore, measured in the following manner. In this example, the reference chromaticity is set to the chromaticity G existing near a point defined by x and y coordinates of 0.20 and 0.53 in the standard colorimetric system of FIG. 8.

First, it is determined whether the light emitted from the green LED 3b lies near the point defined by x and y coordinates of 0.21 and 0.71 in the standard colorimetric system of FIG. 8 or not. Specifically, the chromaticity of light emitted from the green LED 3b is measured to determine a difference between the measured chromaticity and the reference chromaticity G. When the measured chromaticity of light emitted from the green LED 3b does not lie near the reference chromaticity G, the red LED 3a and the blue LED 3c are actuated to visually shift the chromaticity of light emitted from the green LED 3b to the red and blue sides so as to eliminate the difference between the measured chromaticity and the reference chromaticity G. A test is performed to determine values of the PWM signals required to produce a mixture of red and blue lights in proportions for eliminating the difference between the chromaticity of light emitted from the green LED 3b and the reference chromaticity G (or required to have the chromaticity of light emitted from the pixel 3 fall within an allowable range predetermined around the reference chromaticity G).

In the above manners, correction PWM signals for the red, green, and blue LEDs 3a, 3b, and 3c of each pixel 3 are determined which are required to eliminate shifts between the luminance and chromaticity of light emitted from the green LED 3b and the target ones. Similarly, correction PWM signals required to correct each of red and blue lights to be emitted from the red and blue LEDs 3a and 3c are determined.

Referring back to FIG. 1, the image signal converter 8 provides red, green, and blue image signals R, G, and B to each of the arithmetic circuits 6 through the interface 5. Each of the arithmetic circuits 6 corrects image signals R, G, and B in color tone to produce the image signals R', G', and B' in the form of the PWM signals to be inputted to the red, green, and blue LED drivers 7a, 7b, and 7c for actuating the red, green, and blue LEDs 3a, 3b, and 3c, respectively, thereby minimizing the irregularity in color, or difference in color tone between the pixels 3.

If the primary color lights: red, green, and blue lights emitted directly from the red, green, and blue LEDs 3a, 3b, and 3c based on the reference PWM signals are defined as R, G, and B, and red, green, and blue lights corrected based on the image signals R', G', and B' are defined as R', G', and B', the corrected red, green, and blue lights R', G', and B' are $$R' = (1 + \alpha_1)R + \alpha_2 G + \alpha_3 B$$
$$= R + (\alpha_1 R + \alpha_2 G + \alpha_3 B)$$

where $\alpha_1$, $\alpha_2$, $\alpha_3$ are correction factors for the red, green, and blue lights.

$$G' = \beta_1 R + (1 + \beta_2)G + \beta_3 B$$
$$= G + (\beta_1 R + \beta_2 G + \beta_3 B)$$

where $\beta_1$, $\beta_2$, $\beta_3$ are correction factors for the red, green, and blue lights.

$$B' = \gamma_1 R + \gamma_2 G + (1 + \gamma_3)B$$
$$= B + (\gamma_1 R + \gamma_2 G + \gamma_3 B)$$

where $\gamma_1$, $\gamma_2$, $\gamma_3$ are correction factors for the red, green, and blue lights.

Thus, the image signals R', G', and B' (i.e., the corrected PWM signals to be inputted to the red, green, and blue LED drivers 7a, 7b, and 7c) are given by the following equation.

$$A' = A + XA$$

$$A' = \begin{pmatrix} R' \\ G' \\ B' \end{pmatrix}, A = \begin{pmatrix} R \\ G \\ B \end{pmatrix}, X = \begin{pmatrix} \alpha_1 & \alpha_2 & \alpha_3 \\ \beta_1 & \beta_2 & \beta_3 \\ \gamma_1 & \gamma_2 & \gamma_3 \end{pmatrix}$$

where A indicates the reference PWM signal determined directly based on the image signal outputted from the image signal converter 8 and XA indicates the correction PWM signal.

Each of the arithmetic circuits 6 has a table in a memory (not shown) which lists the correction factors, as described above, and looks up them in response to input of each of the image signals R, G, and B from the image signal converter 8 to produce the corrected image signals R', G', and B'.

FIGS. 4(a), 4(b), and 4(c) show an example of a combination of the reference PWM signal and the correction PWM signals when it is required to emit the green light the pixel 3.

The reference PWM signal, as shown in FIG. 4(a), whose width L4 is a function of the duration of emission of light from the green LED 3b and height h4 is a function of a current value is provided within one cycle (1/60 sec.) of the image signal inputted to the image signal converter 8 by the arithmetic circuit 6 to the green LED driver 7b. The arithmetic circuit 6 also outputs, as shown in FIG. 4(b), the correction PWM signal having the width L5 and the height h5 to the red LED driver 7a prior to rising of the reference PWM signal, thereby mixing red light visually with the green light emitted from the green LED 3b to shift the green light to the red side. Further, the arithmetic circuit 6 outputs, as shown in FIG. 4(c), the correction PWM signal to the blue LED driver 7c whose width L6 is identical with the width L4 of the reference PWM signal and height h6 is smaller than the height h4 of the reference PWM signal, thereby shifting the green light to the blue side further. This causes the light emitted from each pixel 3 to be brought into agreement with or close to the reference chromaticity G.

Therefore, when it is required to produce the green light over the screen of the display device 1, for example, the chromaticity adjustment, as described above, may be performed to bring the chromaticity of light emitted from each pixel 3 agreement with or close to the reference chromaticity G, thereby eliminating or minimizing the irregularity in color between the pixels 3.

FIGS. 5(a), 5(b), and 5(c) show the second example of a combination of the reference PWM signal and the correction PWM signals when it is required to emit the green light from the pixel 3.

The reference PWM signal, as shown in FIG. 5(a), is provided within one cycle (1/60 sec.) of the image signal inputted to the image signal converter 8 by the arithmetic circuit 6 to the green LED driver 7b. The arithmetic circuit 6 also outputs the correction PWM signals, as shown in FIGS. 5(b) and 5(c), to the red LED driver 7a and the blue LED driver 7c, respectively, prior to rising of the reference PWM signal, thereby shifting the green light to the red and blue sides to bring the chromaticity of light emitted from the pixel 3 into agreement with or close to the reference chromaticity G.

FIGS. 6(a), 6(b), and 6(c) show the third example of a combination of the reference PWM signal and the correction PWM signals when it is required to emit the green light from the pixel 3.

In this example, the reference PWM signal inputted to the green LED driver 7b and the correction PWM signals inputted to the red and blue LED drivers 7a and 7c have the same width. If it is required to correct the chromaticity of green light emitted from the green LED 3b by substantially the same degree as that in the first example shown in FIGS. 4(a) to 4(c), the correction PWM in FIG. 6(b) is set equal in area to the one shown in FIG. 4(b), and, the correction PWM in FIG. 6(c) is set equal in area to the one shown in FIG. 4(c). A plurality of correction PWM signals may alternatively be provided to actuate each of the red and blue LEDs 3a and 3c as long as a total area of the PWM signals is identical with that of a corresponding one of the correction PWM signals of FIGS. 4(b) and 4(c) and the length of time all the correction PWM signals are outputted is so set as to fall within one cycle (1/60 sec.) of the image signal inputted to the image signal converter 8.

FIGS. 7(a), 7(b), and 7(c) show the fourth example of a combination of the reference PWM signals and the correction PWM signals for correcting both the luminance and chromaticity of light produced by the pixel 3 when it is required to mix the red, green, and blue lights emitted from the red, green, and blue LEDs 3a, 3b, and 3c to produce any other color light from the pixel 3.

The arithmetic circuit 6 provides the reference PWM signals having the same height to the red, green, and blue LED drivers 7a, 7b, and 7c to actuate the red, green, and blue LEDs 3a, 3b, and 3c, respectively. Prior to output of the reference PWM signals, the arithmetic circuit 6 provides the correction PWM signals to the red, green, and blue LED drivers 7a, 7b, and 7c, respectively. To take an example, as shown in FIG. 7(a), of correcting the green light emitted from the green LED 3b of one of the pixels 3, the correction PWM signals $\beta_1 R$, $\beta_2 G$, and $\beta_3 B$ are outputted adjust before the output of the reference PWM signal to the green LED driver 7b. The correction PWM signal $\beta_1 R$ serves to produce the red light from the red LED 3a to shift the green light to the red side. The correction PWM signal $\beta_3 B$ serves to produce the blue light from the blue LED 3c to shift the green light to the blue side. The correction PWM $\beta_2 G$ serves to correct the luminance of the light emitted from the green LED 3b. This causes both the luminance and chromaticity of the light emitted from the pixel 3 to be brought into agreement with or close to target ones, respectively.

The correction PWM signals in each of FIGS. 7(a) to 7(c) are outputted in sequence from the arithmetic circuit 6, but may be outputted simultaneously just before the output of the reference PWM signal. The height and width of each of the correction PWM signals may also be changed as long as an area thereof is unchanged. The width of each of the reference PWM signals and the correction PWM signals may be increased up to the time length of one cycle (e.g., 1/60 sec.) of the image signal inputted to the image signal converter 8. Further, the reference PWM signals and the correction PWM signals shown in FIGS. 7(a), 7(b), and 7(c) may be mixed to produce three corrected PWM signals one for each of the red, green, and blue LED drives 7a, 7b, and 7c.

The adjustment of chromaticity of light emitted from each pixel 3 will also be discussed in detail with reference to FIG. 8.

Assuming that the chromaticity of green light emitted from the green LED 3b is, as indicated by go, within the range S, the arithmetic circuit 6 turns on the red LED 3a to shift the chromaticity go of the green light to the chromaticity g1 and also turns on the blue LED 3c to shift the chromaticity g1 to the chromaticity g2 which falls within an allowable range around the target or reference chromaticity G.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A display device comprising:
   a screen defined by a matrix of pixels on which an image represented by an image input signal is to be displayed;
   first light-emitting elements, one for each of the pixels, each of said first light-emitting elements being actuated to produce light of a first color in a corresponding one of the pixels;
   second light-emitting elements, one for each of the pixels, each of said second light-emitting elements being actuated to produce light of a second color different from the first color in a corresponding one of the pixels; and
   a light-emitting element controlling circuit responsive to the image input signal to control actuation of each of said first and second light-emitting elements to form the image on said screen, said light-emitting element controlling circuit actuating said second light-emitting element in each of the pixels to visually mix the light of the second color with the light of the first color produced by a corresponding one of said first light-emitting elements in a given proportion to minimize a difference in chromaticity of the lights of the first color between the pixels.

2. A display device as set forth in claim 1, wherein said light-emitting element controlling circuit also actuates said first light-emitting element in each of the pixels to visually mix the light of the first color with the light of the second color produced by a corresponding one of said second light-emitting elements in a given proportion to minimize the difference in chromaticity of the lights of the second color between the pixels.

3. A display device as set forth in claim 1, further comprising third light-emitting elements, one for each of the pixels, each of said third light-emitting elements being actuated to produce light of a third color different from the first and second colors, and wherein said light-emitting element controlling circuit actuates said second light-emitting element and said third light-emitting element in each of the pixels in a given luminance proportion to minimize a shift in chromaticity of the light of the first color produced by a corresponding one of the first light-emitting elements from a reference one.

4. A display device as set forth in claim 3, wherein each of the first color, the second color, and the third color is one of red, green, and blue.

5. A display device as set forth in claim 3, wherein each of said first, second, and third light-emitting elements is implemented by a light-emitting diode.

6. A display device as set forth in claim 1, wherein said light-emitting element controlling circuit is responsive to the image input signal to produce reference pulse signals each for actuation of one of the first light-emitting elements for producing the light of the first color at a given luminance specified by the image input signal, each of the reference pulse signals having a width specifying a duration of emission of the light from a corresponding one of the first light-emitting elements and a height that is a function of a value of current for excitation of the one of the first light-emitting elements, said light-emitting element controlling circuit storing therein correction factors each required to substantially compensate for a shift in chromaticity of the light emitted from one of first light-emitting elements from a reference one and producing correction pulse signals based on the correction factors each of which is applied to a corresponding one of said second light-emitting elements to produce the light of the second color, thereby minimizing the difference in chromaticity of the lights of the first color between the pixels.

7. A display device as set forth in claim 6, wherein said light-emitting element controlling circuit produces the correction pulse signals each of which has a width substantially identical with the width of a corresponding one of the reference pulse signals and a height determined based on a corresponding one of the correction factors as a function of the shift in chromaticity of the light from the reference one.

8. A display device as set forth in claim 6, wherein said light-emitting element controlling circuit produces the correction pulse signals each of which has a height substantially identical with the height of a corresponding one of the reference pulse signals and a width determined based on a corresponding one of the correction factors as a function of the shift in chromaticity of the light from the reference one.

9. A display device as set forth in claim 6, wherein said light-emitting element controlling circuit outputs each of the correction pulse signals in a given time sequential relation to output of a corresponding one of the reference pulse signals.

10. A display device as set forth in claim 6, wherein said light-emitting element controlling circuit corrects each of the reference pulse signals so as to substantially eliminate a difference between a luminance of the light emitted from a corresponding one of the first light-emitting elements and a target one.

11. A display device as set forth in claim 3, wherein said light-emitting element controlling circuit is responsive to the image input signal to produce reference pulse signals each for actuation of one of the first light-emitting elements for producing the light of the first color at a given luminance specified by the image input signal, each of the reference pulse signals having a width specifying a duration of emission of the light from a corresponding one of the first light-emitting elements and a height that is a function of a value of current for excitation of the one of the first light-emitting elements, said light-emitting element controlling circuit storing therein correction factors required to substantially compensate for a shift in chromaticity of the light emitted from each of first light-emitting elements from a reference one and producing correction pulse signals based on the correction factors which are applied to said second and third light-emitting elements in a corresponding one of the pixels to produce the lights of the second and third colors, thereby visually shifting the light of the first color to the second and third colors to minimize the difference in chromaticity of the lights of the first color between the pixels.

12. A display device as set forth in claim 11, wherein said light-emitting element controlling circuit corrects each of the reference pulse signals so as to substantially eliminate a difference between a luminance of the light emitted from a corresponding one of the first light-emitting elements and a target one.

* * * * *